United States Patent Office 3,487,856
Patented Jan. 6, 1970

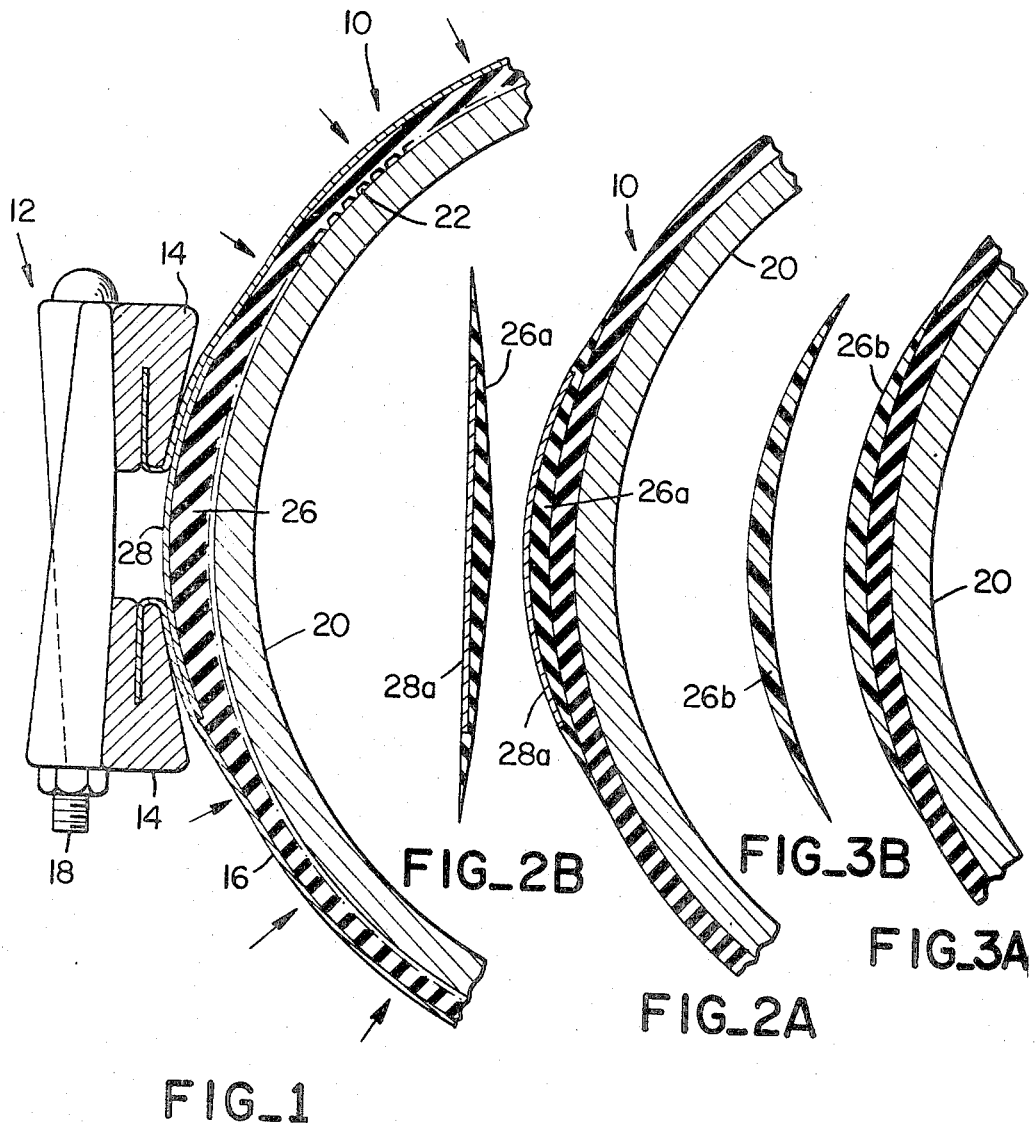

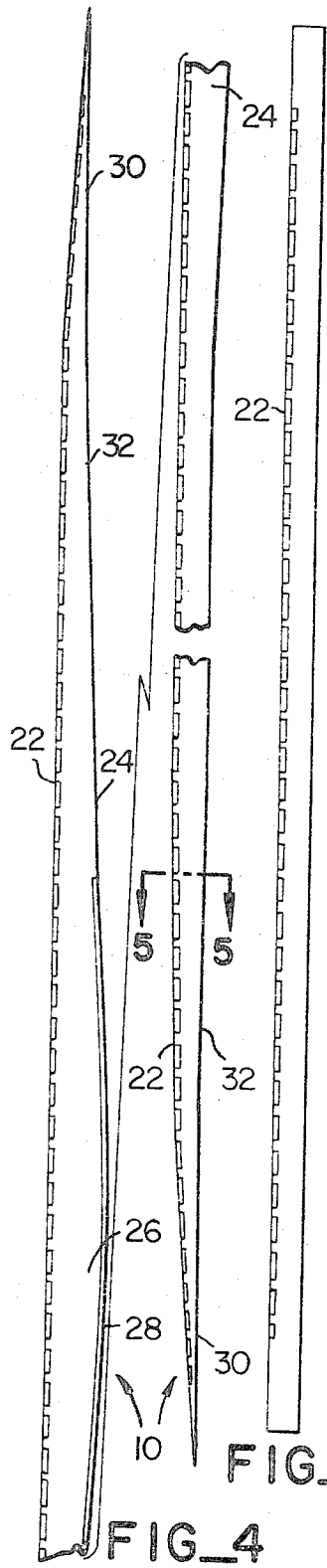
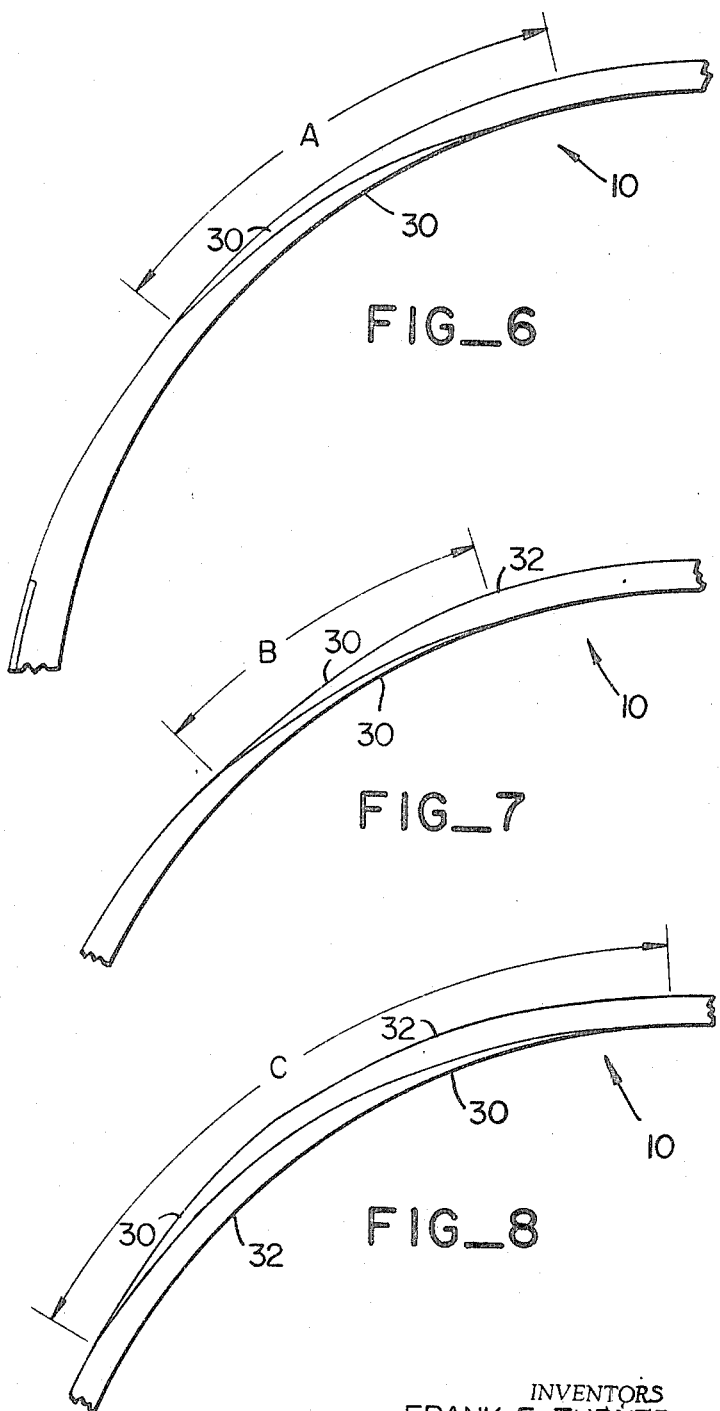

3,487,856
GASKET FOR PIPE CLAMP
Frank E. Turner, 3 Greenfield Court, San Mateo, Calif. 94403, and Thomas A. Graham, 1440 Orange Ave., San Carlos, Calif. 94070
Filed Dec. 14, 1966, Ser. No. 601,696
Int. Cl. F16l 55/14, 33/06, 33/18
U.S. Cl. 138—99                    3 Claims

ABSTRACT OF THE DISCLOSURE

A sheet-type flexible gasket for a pipe clamp having a sheet metal band with lugs at its ends drawn together by bolts, said gasket having a portion of increased thickness between its end portions which have a double taper. The raised portion has an armour strip which supports lugs at opposite sides and produces increased gasket sealing pressure on the pipe between the clamp lugs.

---

This invention relates to an improved gasket for use with pipe clamps of the type comprising a flexible band that holds the gasket around the pipe with lugs on the band that are drawn together to tighten it.

With such pipe clamps the sealing effectiveness depends on the pressure exerted by the flexible band on the gasket located between the band and the pipe surface, and this pressure is controlled by the lugs on the band when they are drawn together by bolts. However, in every pipe clamp of the aforesaid type the lugs must be spaced apart in order to give them some room for take-up in tightening the band. In this area between the lugs the leakage problem is most critical because the band is not directly over the gasket pressing it against the pipe. As part of the prior efforts to solve this problem a metal armouring plate or strip was utilized on the outer surface of the gasket as a bridging member between the lugs which also provided a surface on which the lugs could slide as they were drawn together in tightening the band. However, the armouring strip alone did not solve the problem because it did not transmit sufficient sealing pressure to the gasket between the end points where it was engaged by the lugs. This was particularly true for pipes of slightly larger than the nominal size for the clamp used which caused a larger gap between the lugs on the band.

An object of the present invention is to provide a gasket that will overcome the aforesaid problem of diminished gasket sealing pressure in the area between lugs of a pipe clamp and instead will cause the armour strip to exert greater pressure thereby allowing the lugs to remain farther apart when they bear on the ends of the armour strip. Our invention thus makes it possible to provide a pipe clamp that can tolerate a greater distance between lugs and yet seal higher internal pipe pressures than heretofore possible with prior art gaskets. Increasing the allowable gap between lugs is particularly important because it provides a clamp with a greater adjustability and thus adaptable to a larger range of pipe sizes. This is hightly advantageous because it drastically reduces inventory requirements of pipeline maintenance departments and allows a relatively few clamp sizes to fit a wide range of types and sizes of pipe.

Another object of the present invention is to provide a gasket for use with a pipe repair clamp having a portion between its ends with an increased thickness that causes a distribution of forces resulting from the clamp lugs pressing on the thicker portion and an increased sealing pressure beneath it.

Another object of the present invention is to provide a gasket for a pipe clamp that will maintain substantially a uniform thickness under a pipe clamp band despite the fact that the gasket overlaps at its ends and despite the fact that the amount of overlap may vary substantially for a gasket of a particular nominal size. Thus, in tightening a band used with our gasket a uniform sealing pressure can be maintained completely around the pipe including the area of the overlapping end portions. This feature of our invention is accomplished by providing a gasket having adjoining portions at both ends that taper at two different angles and which normally overlap when the gasket is installed.

Still another object of the present invention is to provide a pipe gasket of the aforesaid type that is particularly well adapted for ease and economy of manufacture.

Other objects, advantages and features of the invention will become apparent from the following detailed description presented in conjunction with the accompanying drawings in which:

FIG. 1 is a fragmentary view in elevation and in section showing a typical pipe clamp utilizing a gasket embodying the principles of the present invention;

FIG. 2A is a fragmentary view in elevation and in section of a modified form of the gasket in FIG. 1;

FIG. 2B is a view in section showing an auxiliary member of the gasket of FIG. 2;

FIG. 3A is a fragmentary view in elevation and in section of another modified form of gasket according to our invention;

FIG. 3B is a view in section showing an auxiliary member of the gasket of FIG. 3;

FIG. 4 is a view in side elevation of the gasket shown in FIG. 1 as it appears when extended before installation with portions removed to conserve space;

FIG. 5 is a view in section along the line 5—5 of FIG. 4;

FIGS. 6–8 are views in side elevation showing the gasket of FIG. 4 with various amounts of end overlap.

With reference to the drawings, FIG. 1 shows an armoured gasket 10 embodying the principles of the present invention as it appears when used in combination with a pipe clamp 12. The latter is representative of such pipe clamps which may have various configurations, but which generally comprise a pair of rigid lugs 14 attached to the ends of a flexible sheet metal band 16, the lugs being held together by tightening bolts 18. Between the pipe 20 that is being repaired and the band around it is the gasket 10. As the bolts are tightened the lugs are drawn together and the band presses the gasket firmly about the pipe to seal the leak. Between the lugs there is no band over the gasket, and heretofore the gaskets employed could not press against the pipe with sufficient force to stop leakage. However, in the present invention, as will be described below, the gasket 10 is provided with a varying cross section and an armour strip that combine to overcome this problem.

In FIG. 4, the gasket 10 is shown when extended and before it is installed on the pipe, its varying cross section according to the invention being readily apparent. It may be made from any suitable elastomeric material, and preferably its inner surface 22 is molded with a grid-like pattern of intersecting ridges that allow the gasket to deform against the pipe and form liquid sealing pockets or recesses. Spaced nearer to one end of the gasket at a location on the smooth upper surface 24 thereof is a raised gasket portion 26 that is intended to extend beneath the lugs when the pipe clamp is assembled on a pipe. The thickness of the gasket in this raised portion increases gradually at one end to a maximum at the center of the raised portion and then decreases at the same rate to the other end thereof. Bonded to and embedded in the gasket at the aforesaid raised portion is an armour strip 28 of sheet metal that forms a semirigid base to support the lugs of the pipe clamp. It also forms a bridging member to help distribute the forces of the lugs over the entire raised portion 26 of the gasket and thereby increase the gasket sealing pressure in this otherwise critical leaking area. It will be noted that the armour strip 28 has a slight camber in cross section and that it is centered on the raised portion of the gasket and its ends are flush with the upper gasket surface 24. The camber of the armour strip preferably has a radius of curvature that is somewhat greater than the radius of curvature of the band. However, as the lugs are drawn together to tighten the band, they move toward each other on the armour strip and cause it to assume the curvature of the band while slightly compressing the raised gasket portion 26 beneath. The result of this cooperative action between the pipe clamp lugs, the curved armour strip and the raised gasket portion is an increased gasket sealing pressure beneath the raised portion.

In forming the gasket 10 the raised portion 26 may be molded integrally with the rest of the gasket or, as shown in FIGS. 2A and 2B, a double wedge shaped member 26a may be formed as a separate component with an armour strip 28a properly embedded. This member may then be bonded to the upper surface of the gasket at the desired location thereon. When formed separately, the raised portion may also be made from some other material such as a fairly hard but somewhat flexible plastic material. (See FIGS. 3A and 3B.) Here, the raised plastic portion 26b is molded with or without a camber and with a taper at both ends and may also be bonded to the outer gasket surface in any convenient manner. If a proper selection of plastic is made it will have suitable surface hardness and strength to support the pipe clamp lugs, and no armour strip will be required.

When our gasket 10 is installed with a pipe clamp it either overlaps with its other end in a clamp having a single set of lugs or its ends overlap with a similar gasket of the same length in a clamp having two sets of lugs and two bands. In either instance, according to another feature of our invention, the combined nominal thickness of the overlapped gasket end portion remains substantially constant even though the amount of overlapping may vary for a relatively wide range of pipe sizes. This feature assures substantially constant gasket pressure all around the pipe and is accomplished by providing the gasket 10 with a double or compound taper in cross section at both ends. As shown in FIG. 4, an extreme end portion 30 at both ends of the gasket 10 are preferably similar in shape and have a greater degree of taper than another portion 32 directly adjacent to it, which tapers at a smaller angle. On gaskets as shown in FIG. 1, the pressure compensating raised portion 26 may be located nearer one end of the gasket, and the angle of the raised portion on the top surface can provide the second tapered portion for that end of the gasket. When the gasket is installed, the compound tapered end portions may overlap each other by varying amounts. Yet the total thickness of the overlapped portions will not vary greatly from the nominal gasket thickness. For example, the gasket 10 is shown in FIGS. 6 to 8 on three pipes of different circumferential dimensions representing a circumferential range of gasket overlap. In FIG. 6 the ideal amount of overlap for the gasket shown is approximately four inches. Yet the nominal thickness of the gasket beneath the pipe clamp band remains substantially constant at a small amount of overlap (2.5 inches) in FIG. 7, and a relatively large amount of overlap (5.5 inches) in FIG. 8. This assures substantially uniform gasket pressure on the pipe beneath the band despite the variance in gasket overlap from the ideal amount.

From the foregoing it should be apparent that our gasket makes possible a greatly increased versatility in pipe clamps, allowing a relatively few sizes of clamps to accommodate a wide variety of pipe styles and sizes. For example, if a pipe being repaired is of the type having an outside diameter even substantially greater than the nominal size for which the clamp is intended, the clamp lugs will be spaced a considerable distance apart and the end overlap of the gasket will be relatively small. Yet, our gasket will press against the pipe with substantially uniform contact pressure including the area between the lugs and the area of overlap. Our invention is thus a significant step forward in the field of pipe clamps and particularly in gaskets for such clamps that provide the actual sealing action.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. A leak sealing gasket for disposition between a pipe outer wall and the curved band of a pipe clamp, comprising:
   a substantially rectangular sheet of elastomeric material having a generally uniform thickness for most of its length;
   an elastomeric bulge portion extending outwardly from one surface of said sheet and across its width dimension which is adapted to be parallel to the pipe, said bulge portion tapering gradually in opposite directions towards the ends of said gasket from a central portion of maximum thickness, the ends of said bulge portion terminating on the surface of said sheet at predetermined locations spaced from the ends thereof;
   an armour strip on the outer surface of said bulge portion and extending across the width of said gasket;
   and extreme end portions of said gasket located beyond the opposite ends of said bulge and tapered in cross section to a feather edge, both said end portions having an angle of taper that is greater than the gasket portion immediately adjacent thereto.

2. The gasket as described in claim 1 wherein said bulge portion is immediately adjacent one of said end portions, and an intermediate gasket portion between said bulge portion and the other extreme end portion having a smaller angle of taper than said extreme end portion.

3. The gasket as described in claim 1 wherein said bulge portion comprises an auxiliary gasket member of elastomeric material having tapered sides in cross section and bonded to the outer surface of said gasket, said armour strip being slightly curved in cross section and centrally mounted on said auxiliary gasket member between its tapered sides.

References Cited

UNITED STATES PATENTS

| 2,069,722 | 2/1937 | Merrill | 138—99 |
| 3,151,632 | 10/1964 | Risley et al. | 138—99 |
| 3,204,665 | 9/1965 | Faint | 138—99 |
| 3,086,555 | 4/1963 | Smith | 138—99 |

FOREIGN PATENTS

| 22,437 | 1896 | Great Britain. |

PATRICK D. LAWSON, Primary Examiner